(12) United States Patent
Philippe et al.

(10) Patent No.: US 9,108,610 B2
(45) Date of Patent: Aug. 18, 2015

(54) ELECTRICALLY BOOSTED BRAKING SYSTEM

(75) Inventors: Richard Philippe, Chelles (FR); Franøois Gaffe, Bondy (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 13/380,121

(22) PCT Filed: Jun. 21, 2010

(86) PCT No.: PCT/EP2010/058731
§ 371 (c)(1),
(2), (4) Date: Dec. 22, 2011

(87) PCT Pub. No.: WO2010/149621
PCT Pub. Date: Dec. 29, 2010

(65) Prior Publication Data
US 2012/0090316 A1    Apr. 19, 2012

(30) Foreign Application Priority Data
Jun. 25, 2009  (FR) ..................................... 09 03104

(51) Int. Cl.
*B60T 13/64* (2006.01)
*B60T 13/74* (2006.01)

(52) U.S. Cl.
CPC .................................. *B60T 13/745* (2013.01)

(58) Field of Classification Search
CPC ... B60T 13/74; B60T 13/745; F15B 13/0444; F15B 13/10; F15B 15/088; F15B 2015/1495
USPC .......................................................... 60/545
See application file for complete search history.

(56) References Cited

U.S. PATENT DOCUMENTS

| 4,255,931 A | * | 3/1981 | Leiber et al. .................. 60/547.1 |
| 6,047,546 A | * | 4/2000 | Takeyama ........................ 60/533 |
| 6,209,967 B1 | * | 4/2001 | Kramer et al. ............. 303/114.3 |

(Continued)

FOREIGN PATENT DOCUMENTS

| DE | 102006030168 A1 * | 1/2007 | ............ B60T 13/746 |
| FR | 2860474 | 4/2005 | |
| JP | H09175376 | 7/1997 | |
| JP | 2004058861 | 2/2004 | |
| JP | 2005349911 | 12/2005 | |
| JP | 2006224958 | 8/2006 | |

(Continued)

OTHER PUBLICATIONS

PCT/EP2010/058731 International Search Report dated Aug. 17, 2010 (4 pages).

*Primary Examiner* — Dwayne J White
*Assistant Examiner* — Matthew Wiblin
(74) *Attorney, Agent, or Firm* — Michael Best & Friedrich LLP (57) ABSTRACT

Braking system comprising a brake booster with electric motor driving the push rod of the piston of the master cylinder via a ball-screw connection and actuated by a control rod. In the casing connected to the master cylinder, the brake booster comprises an actuator piston guided in translational movement by at least two guide pins which are parallel to the axis of the master cylinder and which is driven in translational movement by a ball screw of which the screw, driven by the motor, is offset with respect to the axis of the master cylinder. The screw collaborates with a nut translationally as one with the actuator piston, and a bore of the actuator piston receives a boost piston equipped with a reaction disc and with a plunger piston connected to the control rod.

19 Claims, 6 Drawing Sheets

(56) References Cited

U.S. PATENT DOCUMENTS

| | | | |
|---|---|---|---|
| 7,318,370 B2 * | 1/2008 | Samson et al. | 92/169.2 |
| 7,823,384 B2 * | 11/2010 | Ikeda et al. | 60/545 |
| 2004/0060291 A1 * | 4/2004 | Maligne et al. | 60/593 |
| 2006/0283671 A1 * | 12/2006 | Mackiewicz | 188/73.47 |

FOREIGN PATENT DOCUMENTS

| | | |
|---|---|---|
| JP | 2007022435 | 2/2007 |
| JP | 2007098969 | 4/2007 |
| JP | 2007191133 | 8/2007 |
| WO | 2009068404 | 6/2009 |

* cited by examiner

ELECTRICALLY BOOSTED BRAKING SYSTEM

BACKGROUND OF THE INVENTION

The present invention relates to a braking system comprising a brake booster with electric motor driving the push rod of the piston of the master cylinder via a ball-screw connection and actuated by a control rod.

Braking systems having a master cylinder boosted by an electric brake booster with an in-line ball screw are known but these braking systems have the disadvantage, because of the boost piston, of having a relatively large diameter and therefore of being expensive because of the size of the ball screw. In addition, they are complicated to fit.

SUMMARY OF THE INVENTION

It is an object of the present invention to develop a simple electrically boosted braking system that makes it possible to reduce the cost of manufacture and facilitate operation of the system in a booster failure mode in order to reduce the force that has to be applied in order to brake in the event of booster failure.

To this end, the present invention relates to a braking system of the type defined hereinabove, characterized in that in its casing connected to the master cylinder, the brake booster comprises an actuator piston guided in translational movement by at least two guide pins which are parallel to the axis of the master cylinder, driven in translational movement by a ball screw of which the screw, which is offset with respect to the axis of the master cylinder, is driven by the motor and collaborates with a nut translationally as one with the actuator piston, and a bore of the actuator piston on the axis receives a boost piston equipped with a reaction disc and with a plunger piston connected to the control rod.

This braking system has the advantage of being able to be driven by a ball screw of a smaller diameter because the ball screw is offset from the axis of the master cylinder and not subjected to the dimensional constraints of the master cylinder and to the dimensional constraints of the boost piston. The guide pins allow the actuator piston to operate by an effective slideway connection for guiding it which is also simple to produce.

This solution is all the more advantageous when, according to another feature of the invention, the two guide pins parallel to the axis of the system consist of through-bolts passing through the casing of the brake booster in order on the one side to attach the master cylinder to the brake booster, and on the other, to attach the assembly consisting of the master cylinder and the brake booster to the bulkhead of the vehicle.

According to another advantageous feature, a return spring is mounted on each of the guide pins between the casing of the brake booster and the guide sleeve of the actuator piston and/or a return spring on the boost piston.

According to another advantageous feature, the bore of the actuator piston comprises a shoulder at its entrance at the front side and the boost piston comprises a bearing flange so that it can be pushed in the direction of braking by the actuating piston.

This means of driving has the advantage of occupying very little space and of being able to be integrated perfectly into the shape of the actuator piston, especially when, according to another feature, the actuator piston has a body of substantially triangular cross section in a plane perpendicular to the axis, of which triangle the vertex is occupied by the nut of the ball screw and the ends of the base are occupied by guide sleeves sliding on the guide pins.

According to another advantageous feature, the brake booster comprises a casing formed by an end wall and a cover and the through-bolts comprise a shoulder and a flange near each of the ends beyond the part forming the guide pin so as to bear on one side against the inside of the cover and on the other against the inside of the end wall, and these through-bolts continue beyond the shoulder and the flange as threaded portions.

Thus, the casing of the brake booster is kept perfectly still by the through-bolts, its end wall and the flange of the master cylinder.

According to another feature, the boost piston comprises a hub with a cylindrical sleeve on the axis accepting the plunger piston.

According to another feature, a spring cup is attached to the rear end of the boost piston for a return spring of the plunger piston, this spring also bearing against a flange that forms an end stop secured to the control rod so as to return the plunger piston against its back stop defining the jump with respect to the reaction disc when the brake booster is in the rest position.

According to another feature, the two guide pins are symmetric with respect to the axis.

In general, the use of the through-bolts as guide pins and the two return springs, which apply a reduced load to the actuator piston, means that the actuator piston can operate perfectly smoothly via its slideway connection with the guide pins and be driven by the nut borne by the screw of the ball screw system, this screw also acting as a third guideway.

That also makes it possible to reduce the load on switching into emergency mode, should the electric brake booster fail.

BRIEF DESCRIPTION OF THE DRAWINGS

The present invention will be described in more detail hereinafter using an exemplary embodiment of a braking system with master cylinder boosted by an electric brake booster depicted schematically in the attached drawings in which.

DETAILED DESCRIPTION

Figure 1:
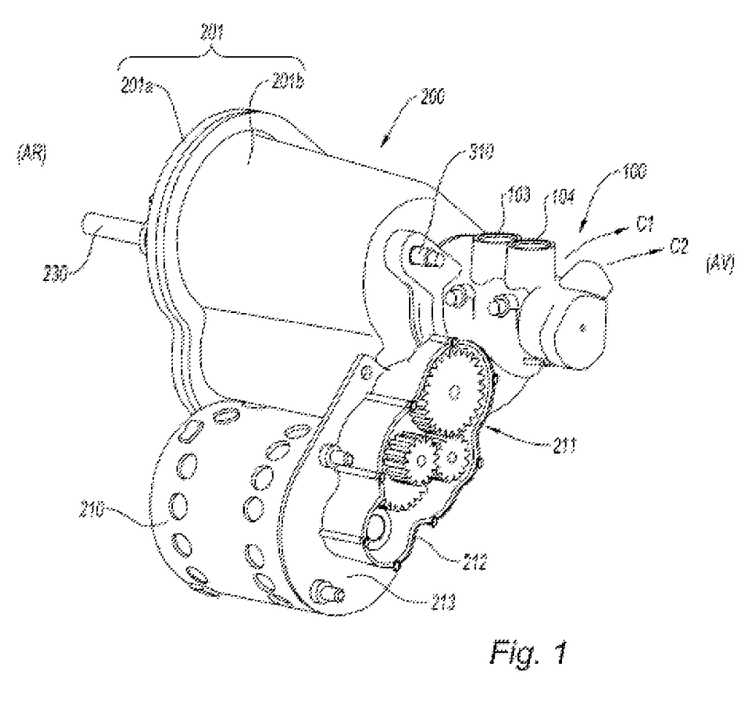
FIG. 1 is a perspective view of the braking system, viewed from the front from the tandem master cylinder end.
Figure 2:
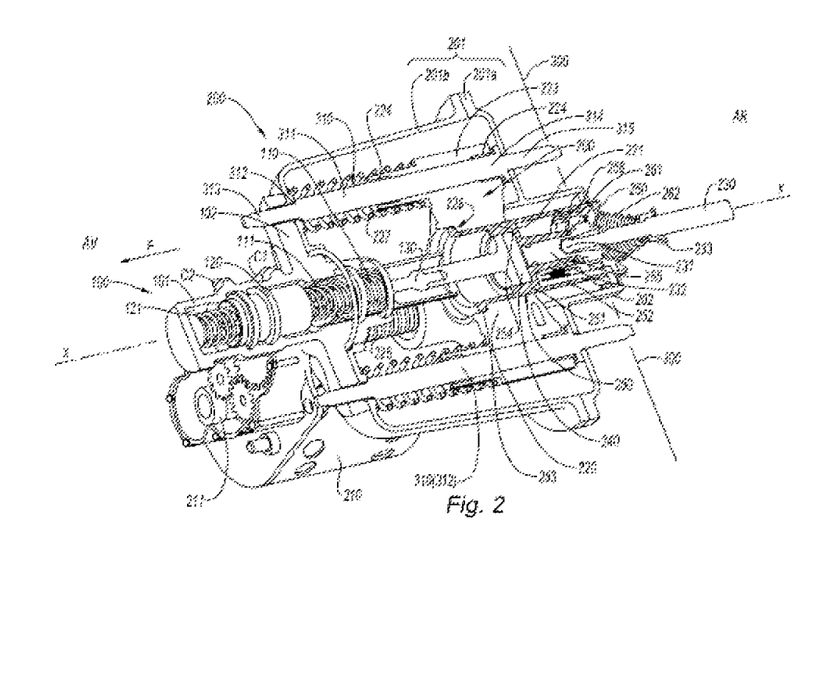
FIG. 2 is a view in cross section on the mid-plane of the braking system according to FIG. 1.

According to FIGS. 1 and 2, the braking system with a master cylinder boosted by an electric brake booster is made up of a master cylinder 100 connected to an electric brake booster 200 equipped with an actuator made up of an electric motor 210 and of reduction gearing 211 controlling the translational movement of the actuator piston 220 housed in a casing 201 and acting on the master cylinder 100 in the direction of braking (F). The master cylinder 100 in this instance is a tandem master cylinder of which the casing 101 comprises two inlets 103, 104 (FIG. 5) in its upper part to accept the two outlets from the brake fluid reservoir. On the side, the two chambers 111, 121, one of them delimited by the primary piston 110 and the other by the secondary piston 120, are connected to the two brake circuits C1, C2. The cups (seals) associated with the two pistons and the secondary piston and the springs are depicted in relief beyond the plane of section in FIG. 2.

By convention, the front end (AV) of the brake booster 200 is the end that takes the master cylinder 100 and the rear end (AR) is the end facing toward the bulkhead 300 and that accepts the control rod 230.

The tandem master cylinder 100 of axis XX is connected to the casing 201 of the electric brake booster 200 by two through-bolts 310 used to attach the assembly (100, 200) to the bulkhead 300 of the vehicle. FIG. 1 also shows the control rod 230 connected to the brake pedal and the electric motor 210 fixed to the flange 213 of the casing 212 of the reduction gearing 211 the cover of which has been removed. The casing 212 is itself attached to the casing 201 of the brake booster by means which have not been depicted.

In more detail, the three-dimensional view, sectioned on a mid-plane of FIG. 2, using the traditional orientation whereby the master cylinder 100 is positioned in front of the brake booster 200, shows the tandem master cylinder 100 and the casing 201 of the electric brake booster 200 assembled; they are connected by the two identical through-bolts 310 which are in symmetric positions with respect to the axis XX and, at one end, connect the tandem master cylinder 100 and the casing 201 and at the other end attach the assembly (100, 200) to the bulkhead 300.

The primary piston 110 is connected to the actuator piston 220 by a push rod 130 pressing against the reaction disc 240, housed in the hub 251 of the boost piston 250. The latter is made up of a cylindrical sleeve 252 equipped at the front with a drive flange 253 to collaborate with the actuator piston 220; the cylindrical sleeve 252 slides in a bore 221 of the actuator piston 220 along the axis XX.

The hub 251 of the boost piston 250 continues beyond the housing 254 of the reaction disc 240 as a guide cylinder 255 for a plunger piston 232. The latter (232) is connected to the ball-shaped head 231 of the control rod 230 to allow the control rod some angular travel with respect to the axis XX.

A spring cup 260 is clipped by tabs 261 into a groove 256 at the rear of the cylindrical sleeve 252 of the boost piston 250; it presses against the edge of the sleeve 252 to accept an end of a return spring 262 which via its other end presses against an end stop 233 secured to the control rod 230 so as to return the plunger piston 232 to its neutral position that defines the jump S (reference gap) to the reaction disc in the rest position.

The displacement sensor associated with the plunger piston 232 for controlling the operation of the motor 210 of the brake booster 200 is not detailed. This for example is a magnetic sensor.

The actuator piston 220 which accepts the boost piston 250 has a body the cross section of which is roughly in the shape of an inverted isosceles triangle, in a plane perpendicular to the axis XX, of which triangle the vertex is occupied by a nut 222 of the ball screw and the two ends of the base each have a guide sleeve 223. The two sleeves 223 which are symmetric with respect to the axis XX of the tandem master cylinder 100, are mounted to slide along a guide pin-forming length 311 of the two through-bolts 310. The elongate guide sleeves 223 which protrude forward from the body of the actuating piston 220 are equipped at each end with a bushing 224 encouraging them to slide on the guide pins 311. The nut 222 of the ball screw collaborates with a screw 225 connected to the output shaft of the reduction gearing 211. This drive system is offset with respect to the axis XX; the screw 225, driven to turn it but prevented from translational movement in bearings 226 at each of its ends causes the translational movement of, and therefore also guides, the nut 222 which is prevented from turning but free to effect a translational movement and incorporated into the body of the actuator piston 220.

Each through-bolt 310, parallel to the axis XX of the tandem master cylinder 100 made up of the cylindrical part forming the guide pin 311, continues on the front end as a shoulder 312 and a threaded portion 313 against which the flange 102 of the casing 101 of the tandem master cylinder bears and to which it is attached. The other end of the through-bolt 310 comprises a flange 314 to press against the end wall 201a of the casing 201 and pass through it as a threaded end 315 which enters the bulkhead 300 in order to attach the assembly (100, 200) thereto.

Each guide sleeve 223 forms, at the front end AV, a shoulder that accepts the end of a return spring 227 pushed onto the guide pin 311 of the through-bolt 310 and that presses against the cover 201b of the casing 201.

In the actuator piston 220, the guide bore 221 of the boost piston 250 is of a stepped shape, forming a shoulder 228 to accept the boost piston 250 and to press against the flange 253 thereof in order to drive it with the push rod 130. The boost piston 250 can also advance freely into the actuator piston 220 in the direction of braking (F) in the event of booster failure.

The assembly is thus assembled by the two through-bolts 310 in a setup that is symmetric with respect to the axis XX which is that of the boost piston 250 and that of the actuator piston 220, while at the same time guaranteeing correct operation thanks to the length of the guide sleeves 223, and in spite of the fact that the ball screw 222, 225 is offset from the axis XX.

The casing 201 bearing the tandem master cylinder 100 and the drive means (210, 211) and that houses the actuator piston 220 is formed of an end wall 201a and of a cover 201b which are pressed against one another at their flange. The end wall of relatively flat shape surrounds the axis XX in the form of a sleeve 202 shaped like a pot, into which the actuator piston 220 arrives and the end of the control rod 230 passes through. The cover 201b, of practically the same length as the guide pins 311, is of substantially frustoconical shape, enveloping the two through-bolts 310 and the screw 225.

The cover 201b presses against the end wall 201a via its flange and the two through-bolts 310 via their shoulder and flange 313, 314 determine the separation.

Figure 3:
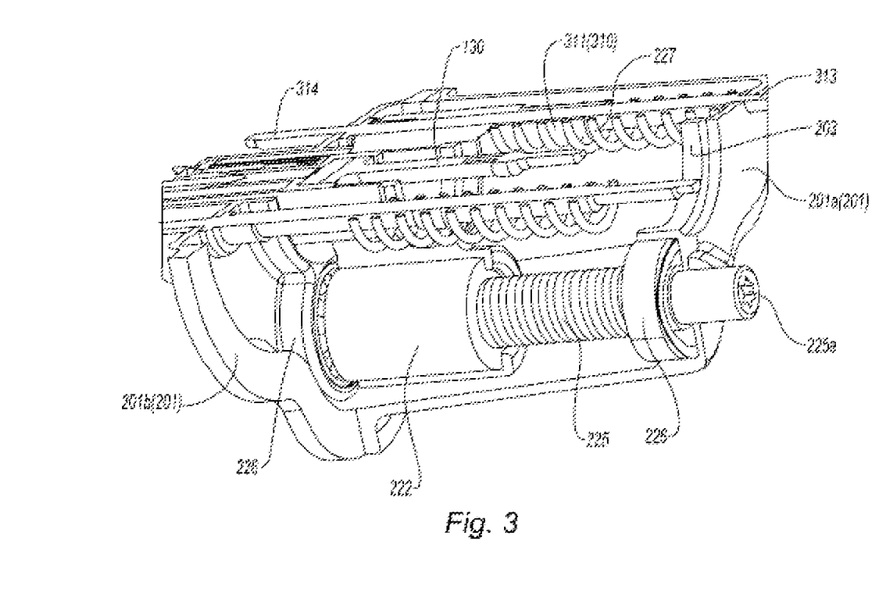
FIG. 3 is a cross section, viewed from the master cylinder end, showing the ball screw of the brake booster.

FIG. 3 is a view in section both on a mid-plane and on a plane perpendicular to the latter, through the casing 201 from a different angle than that of FIG. 2. It shows how the screw 225 is mounted in two rolling bearings 226, and shows the opening 203 for the passage and attachment of the rear end of the tandem master cylinder, the assembly being viewed from the front. The casing of the master cylinder 100 comprises, at the rear, a bearing ring behind its flange 102 so that it can be fixed into the opening 203 in the cover 201b.

The protruding end of the screw 225 comprises a splined housing 225a to form a mating-shape connection for driving purposes with the output from the reduction gearing 211, which has not been depicted in this figure.

Figure 4:
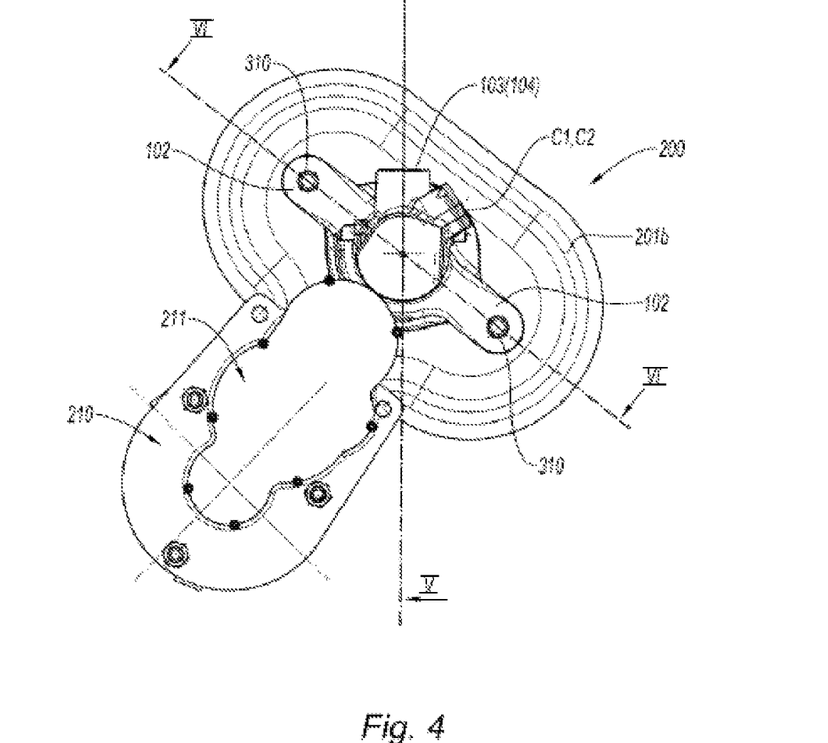
FIG. 4 is a front view of the brake system showing the front end.

FIG. 4 is an end-on view of the tandem master cylinder 100 and the cover 201b of the brake booster 200 and of the reduction gearing 211 with its flange 212 carrying the electric motor 210.

The position depicted with the vertical plane of section v-v is the position in which the brake booster is installed in the vehicle, the inlets 103, 104 of the master cylinder being vertical in order to accept the reservoir.

Two tabs that form the flange 102 of the master cylinder 100 are used to attach it using the through-bolts 310.

Figure 5:
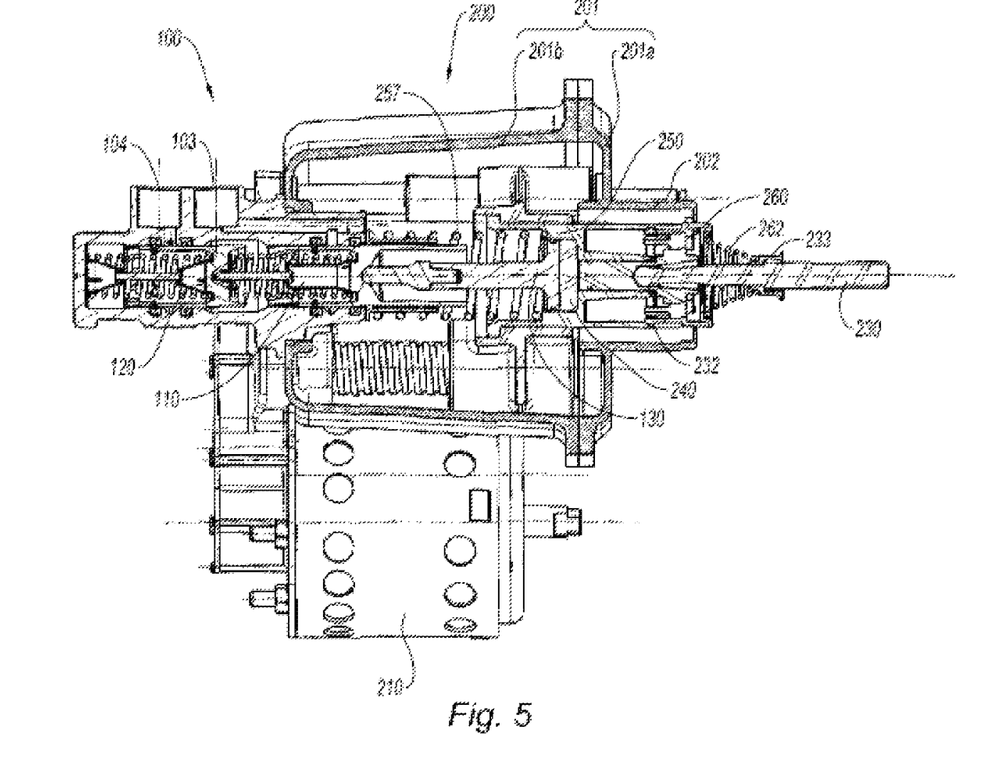
FIG. 5 is a view in axial section on the vertical plane V-V of FIG. 4.

FIG. 5 is a view in section on the vertical plane V-V of FIG. 4 showing the various elements that make up the braking system with the tandem master cylinder 100 at the front bearing the electric brake booster 200 on the axis XX, the motor 210, the reduction gearing 211 on the output side of the motor and the screw 225 of the ball screw drive of the actuator piston 220 and the boost piston 250 and the various elements housed within the boost piston.

In this example, we notably have the return spring 257 for the boost piston 250.

Figure 6:
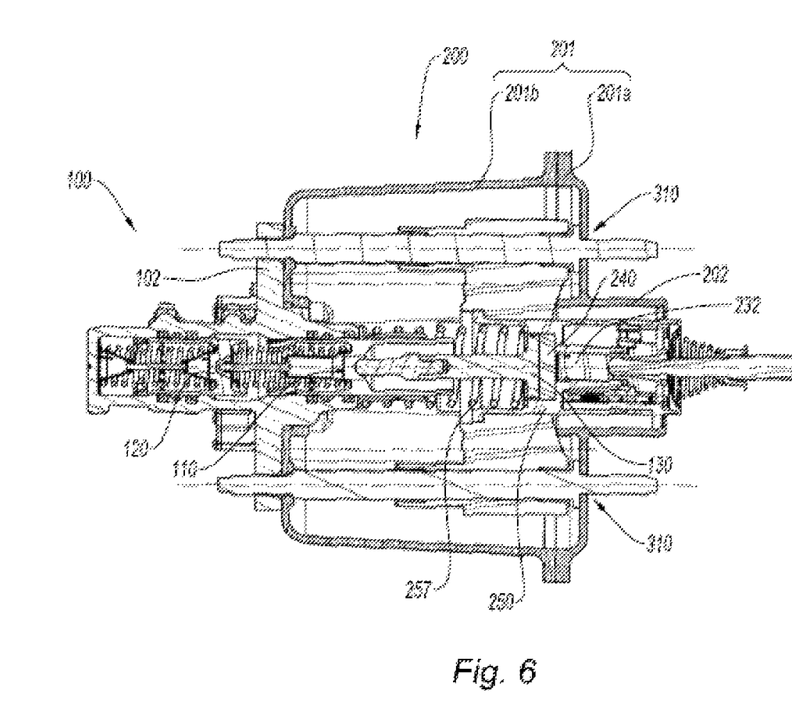
FIG. 6 is a view in section on the mid-plane VI-VI of FIG. 4.

FIG. 6 is a view in section on VI-VI of FIG. 4 quite especially showing the shape of the through-bolts 310 and that of the sleeves 223 of the actuator piston 220, which are guided on the pins.

To sum up, the present invention relates to applications to the automotive braking systems industry.

LIST OF PARTS

100 tandem master cylinder
101 casing
102 flange
103, 104 master cylinder inlet
105 ring
110 primary piston
111 chamber of the primary piston
120 secondary piston
121 chamber of the secondary piston
130 push rod
200 brake booster
201 brake booster casing
201a end wall
201b cover
202 end wall sleeve
203 opening in cover
210 electric motor
211 reduction gearing
212 reduction gearing casing
213 casing flange
220 actuator piston
221 bore
222 nut
223 guide sleeve
224 bushing
225 screw of the ball screw
225 splined housing
226 bearing
227 return spring
228 shoulder
230 control rod
231 head
232 plunger piston
233 end stop
240 reaction disc
250 boost piston
251 hub
252 cylindrical sleeve
253 driving flange
254 housing of reaction disc
255 guide cylinder
256 groove
257 return spring
260 spring cup
261 tab
262 return spring
263 end stop
300 bulkhead
310 through-bolt
311 guide pin
312 shoulder
313 threaded portion
314 flange
315 threaded portion

The invention claimed is:

1. A braking system for a vehicle defining a vertical direction, the braking system comprising a brake booster (200) with an electric motor driving a push rod (130) of a piston of a master cylinder (100) via a ball-screw connection and actuated by a control rod (230) connected to a brake pedal, characterized in that in a casing (201) connected to the master cylinder (100), the brake booster (200) comprises an actuator piston (220)
    guided in translational movement by at least two guide pins (311) which are parallel to an axis (XX) of the master cylinder (100),
    driven in translational movement by a ball screw (222, 225) of which a screw (225) of the ball screw (222, 225), which, when the brake booster (200) is mounted in the vehicle, is offset with respect to a vertical plane that is defined to include the vertical direction and passes through the axis (XX) of the master cylinder (100), is driven by the motor (210) and collaborates with a nut (222) translationally as one with the actuator piston (220), and
    a bore (221) of the actuator piston (220) on the axis (XX) receives a boost piston (250) equipped with a reaction disc (240) and with a plunger piston (232) connected to the control rod (230).

2. The braking system according to claim 1, characterized in that the two guide pins (311) parallel to the axis (XX) of the system include through-bolts (310) passing through the casing (201) of the brake booster (200) on one side in order to attach the master cylinder (100) to the brake booster (200), and on another side, to attach an assembly consisting of the master cylinder (100) and the brake booster (200) to a bulkhead (300) of the vehicle.

3. The braking system according to claim 2, characterized in that the brake booster (200) comprises the casing (201) formed by an end wall (201a) and a cover (201b) and the through-bolts (310) each comprise a shoulder (312) and a flange (314) near ends of the through-bolt beyond a part forming the guide pin (311) so as to bear on one side against an inside of the cover (201b) and on another side against an inside of the end wall (201a), and these through-bolts (310) continue beyond the shoulder and the flange as threaded portions (313, 315).

4. The braking system according to claim 1, characterized in that the bore (221) of the actuator piston (220) comprises a shoulder (228) at an entrance at a front side and the boost piston (250) comprises a bearing flange (253) so that the boost piston can be pushed in a direction of braking (F) by the actuating piston (220).

5. The braking system according to claim 1, characterized in that the actuator piston (220) has a body of substantially triangular cross section in a plane perpendicular to the axis (XX), of which triangle a vertex is occupied by the nut (222) of the ball screw and ends of a base are occupied by guide sleeves (223) sliding on the guide pins (311).

6. The braking system according to claim 5, characterized in that the two guide pins (311) are symmetric with respect to the axis (XX).

7. The braking system according to claim 1, characterized in that the boost piston (250) comprises a hub (251) with a cylindrical sleeve (255) on the axis (XX) accepting the plunger piston (232).

8. The braking system according to claim 7, characterized by a spring cup (260) attached to a rear end of the boost piston (250) for a return spring (262) of the plunger piston (232), the return spring also bearing against a flange that forms an end stop (233) secured to the control rod (230) so as to return the plunger piston (232) against a back stop defining a jump with respect to the reaction disc (240) when the brake booster is in a rest position.

9. The braking system according to claim 1, further including a return spring (257) applied to the boost piston (250).

10. The braking system according to claim 1, further comprising return springs (227) mounted on the guide pins (311) between the casing of the brake booster and a guide sleeve of the actuator piston.

11. A braking system comprising a brake booster (200) with an electric motor driving a push rod (130) of a piston of a master cylinder (100) via a ball-screw connection and actuated by a control rod (230) connected to a brake pedal, characterized in that in a casing (201) connected to the master cylinder (100), the brake booster (200) comprises an actuator piston (220)
- guided in translational movement by at least two guide pins (311) which are parallel to an axis (XX) of the master cylinder (100),
- driven in translational movement by a ball screw (222, 225) of which a screw (225) of the ball screw (222, 225), which is offset with respect to the axis (XX) of the master cylinder (100), is driven by the motor (210) and collaborates with a nut (222) translationally as one with the actuator piston (220), and
- a bore (221) of the actuator piston (220) on the axis (XX) receives a boost piston (250) equipped with a reaction disc (240) and with a plunger piston (232) connected to the control rod (230),
- characterized in that the actuator piston (220) has a body of substantially triangular cross section in a plane perpendicular to the axis (XX), of which triangle a vertex is occupied by the nut (222) of the ball screw and ends of a base are occupied by guide sleeves (223) sliding on the guide pins (311).

12. The braking system according to claim 11, further comprising return springs (227) mounted on the guide pins (311) between the casing of the brake booster and a guide sleeve of the actuator piston.

13. The braking system according to claim 11, characterized in that the two guide pins (311) parallel to the axis (XX) of the system include through-bolts (310) passing through the casing (201) of the brake booster (200) on one side in order to attach the master cylinder (100) to the brake booster (200), and on another side, to attach an assembly consisting of the master cylinder (100) and the brake booster (200) to a bulkhead (300) of the vehicle.

14. The braking system according to claim 13, characterized in that the brake booster (200) comprises a casing (201) formed by an end wall (201a) and a cover (201b) and the through-bolts (310) each comprise a shoulder (312) and a flange (314) near ends of the through-bolt beyond a part forming the guide pin (311) so as to bear on one side against an inside of the cover (201b) and on another side against an inside of the end wall (201a), and these through-bolts (310) continue beyond the shoulder and the flange as threaded portions (313, 315).

15. The braking system according to claim 11, characterized in that the bore (221) of the actuator piston (220) comprises a shoulder (228) at an entrance at a front side and the boost piston (250) comprises a bearing flange (253) so that the boost piston can be pushed in a direction of braking (F) by the actuating piston (220).

16. The braking system according to claim 11, characterized in that the boost piston (250) comprises a hub (251) with a cylindrical sleeve (255) on the axis (XX) accepting the plunger piston (232).

17. The braking system according to claim 16, characterized by a spring cup (260) attached to a rear end of the boost piston (250) for a return spring (262) of the plunger piston (232), the return spring also bearing against a flange that forms an end stop (233) secured to the control rod (230) so as to return the plunger piston (232) against a back stop defining a jump with respect to the reaction disc (240) when the brake booster is in a rest position.

18. The braking system according to claim 11, characterized in that the two guide pins (311) are symmetric with respect to the axis (XX).

19. The braking system according to claim 11, further including a return spring (257) applied to the boost piston (250).

* * * * *